G. E. HULSE.
BELT CONNECTION.
APPLICATION FILED FEB. 20, 1922.

1,430,553. Patented Oct. 3, 1922.

George E. Hulse Inventor

By his Attorneys
Emery, Varney, Blair & Hogue.

Patented Oct. 3, 1922.

1,430,553

UNITED STATES PATENT OFFICE.

GEORGE E. HULSE, OF NEW HAVEN, CONNECTICUT, ASSIGNOR TO THE SAFETY CAR HEATING & LIGHTING COMPANY, A CORPORATION OF NEW JERSEY.

BELT CONNECTION.

Application filed February 20, 1922. Serial No. 537,772.

*To all whom it may concern:*

Be it known that I, GEORGE E. HULSE, a citizen of the United States, and a resident of New Haven, in the county of New Haven and State of Connecticut, have invented an Improvement in Belt Connections, of which the following is a specification.

This invention relates to connecting devices and more particularly to connections in power transmission belts. One of the objects thereof is to provide a strong and dependable construction of the above nature. Other objects are to provide an inexpensive and efficient construction of the above nature, which is easily assembled, positive in its action, and which requires a minimum degree of attention during operation. Other objects will in part obvious, and in part pointed out hereinafter.

The invention accordingly consists in the features of construction, combinations of elements, and arrangement of parts, which will be exemplified in the structure hereinafter described and in the scope of the application of which will be indicated in the following claims.

Figure 1:
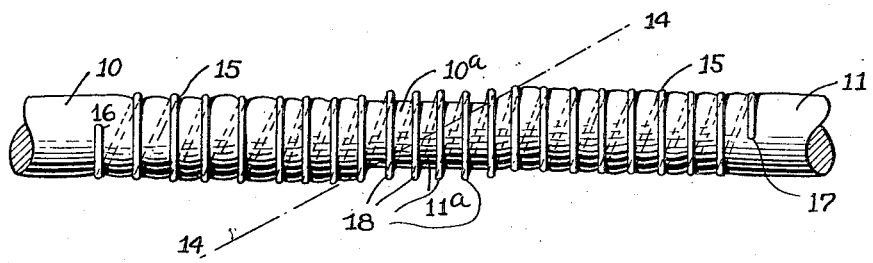

In the accompanying drawing, in which is shown one of the various possible embodiments of this invention, Fig. 1 shows a plan view of joining belt ends and a connecting device.

Figure 2:
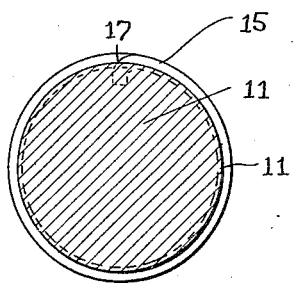
Figure 3:
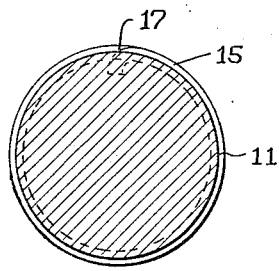

Fig. 2 is an end elevation of the device shown in Fig. 1, showing the position of the connecting device when the belt is free from tension, And Fig. 3 is a view corresponding to that shown in Fig. 2, showing the position of the connecting device when the belt is in normal operation under tension.

Similar reference characters refer to similar parts throughout the several views of the drawing.

Referring now to the drawing in detail, there are shown at 10 and 11, respectively, two joining ends of a belt, which may be of circular cross-section, as shown, or of any section having substantial thickness relative to its width. The belt ends 10 and 11 are preferably diagonally cut or beveled to form overlapping portions $10^a$ and $11^a$, respectively, whereby the two ends 10 and 11 may contact or abut along a plane 14—14, diagonally disposed relative to the axis of the belt.

A coil spring 15 encircles the belt ends 10 and 11, and extends to a substantial distance on either side of the overlapping sections $10^a$ and $11^a$. In order to avoid projecting parts, and therefore not to interfere with the operation of the belt, the ends 16 and 17, of spring 15, may be bent inwardly to slightly enter the belt surface. The inside diameter of spring 15 is preferably smaller than the outside diameter of the belt, as is shown in Fig. 2, to insure its frictional engagement thereon. In operation, as the belt is subjected to tension, spring 15 tends to contract diametrically and to engage more securely the surfaces of belt ends 10 and 11; and thus, as the tension increases, the coils of spring 15 grip into the surface of the belt more and more securely (see Fig. 3). Thus the spring 15, forming a connection between belt ends 10 and 11, carries the tension in the belt, and allows belt ends 10 and 11 to move relative to each other along the diagonal plane 14—14 into normal position of operation, substantially as shown in Fig. 1 of the drawing.

In this substantially normal operating position, the coils of spring 15 surrounding overlapping sections $10^a$ and $11^a$ have an interior cross-section greater than the combined cross sections of the overlapping ends, whereby spring 15 does not bind on the belt at this point, and is free to expand or contact as the tension tends to increase or decrease; and thus allows the above-mentioned relative movement of over-lapping end $10^a$ and $11^a$.

Spring 15 is preferably of relatively small circular pitch, or, in other words, the coils are close together at its section surrounding overlapping ends $10^a$ and $11^a$ as at 18, as compared with its pitch at its ends. This allows for longitudinal expansion.

Thus the tension in the belt may be maintained uniformly at the predetermined tension of spring 15; and stretch in the belt may be taken up by spring 15 through the relative movement of overlapping ends $10^a$ and $11^a$. Furthermore the strength of the belt is not impaired by piercing nor mutilation of any kind, and a safe and reliable connection is assured.

It will thus be seen that there is herein provided apparatus in which the several objects of this invention are achieved, and that the same is of simple construction, yet dependable in action, and is well adapted to meet the exacting conditions of hard practical use.

As various possible embodiments might be made of the above invention, and as various changes might be made in the embodiment above set forth, it is to be understood that all matter herein set forth, or shown in the accompanying drawing, is to be interpreted as illustrative, and not in a limiting sense.

I claim as my invention:

1. In construction for belts and the like in combination, a belt having substantially adjacent ends and resilient means for connecting said ends comprising a coil spring frictionally engaging said belt to a substantial distance from said ends and having a relatively small circular pitch adjacent said ends to allow longitudinal expansion of said coil spring under tension in said belt.

2. In construction for belts and the like in combination, a belt having its ends beveled and adapted thereby to overlap, and means for securing said ends together, comprising a coil spring frictionally engaging the surface of said belt to a substantial distance on either side of said overlapping ends.

3. In construction for belts and the like in combination, a belt of circular cross section having adjacent sections thereof formed to abut along a diagonal plane relative to the axes of said belt, and means forming a resilient connection between said adjacent sections comprising a spiral spring, having an inside diameter smaller than the outside diameter of said belt and adapted thereby to frictionally engage the surfaces of said adjacent sections to a substantial distance on either side of said diagonal abutment.

4. In construction for belts and the like in combination, a belt of circular cross section having its ends beveled to overlap and contact along a diagonal plane relative to the axis of said belt, and a spiral spring frictionally engaging the surface of said belt to a substantial distance on either side of said diagonal plane, thereby to form a resilient connection between said beveled ends, said spiral spring having a relatively small circular pitch at its section adjacent said diagonal plane to allow longitudinal expansion of said spiral spring under tension in said belt.

5. In construction for belts and the like in combination, a belt having adjacent sections overlapping along a diagonal plane with respect to the axis of said belt, said sections being adapted to move relatively along said diagonal plane under tension in said belt, and means for securing together said adjacent sections, comprising a coil spring frictionally engaging the surfaces of said adjacent sections to a substantial distance on either side of said diagonal plane, and adapted to longitudinally expand or contract as said sections relatively move along said diagonal plane, thereby to control the tension in said belt.

6. In construction for belts and the like, in combination, a belt having its ends beveled and adapted thereby to overlap, and a device interposed between said ends and embracing said belt to a substantial distance on either side of said ends and adapted to rip the same as the belt ends are pulled apart, said overlapping beveled ends being adapted to slide relatively under tension in said belt.

7. In construction for belts and the like, in combination, a belt having its ends beveled and adapted thereby to overlap, and a device interposed between said ends and spirally encircling said belt to a substantial distance on either side of said ends and adapted to grip the same as said belt ends are pulled apart, said overlapping beveled ends being adapted to slide relatively under tension in said belt.

In testimony whereof, I have signed my name to this specification this 17th day of February, 1922.

GEORGE E. HULSE.